(12) United States Patent
Daryani et al.

(10) Patent No.: US 12,395,563 B2
(45) Date of Patent: Aug. 19, 2025

(54) SYSTEMS AND METHODS FOR VISITOR IDENTIFICATION USING DEVICE GRAPHS AND COMMUNITY DETECTION

(71) Applicant: Capital One Services, LLC, McLean, VA (US)

(72) Inventors: Sumit Daryani, Ashburn, VA (US); Kye Bae, Cedar Park, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/449,834

(22) Filed: Aug. 15, 2023

(65) Prior Publication Data

US 2025/0063093 A1   Feb. 20, 2025

(51) Int. Cl.
| | | |
|---|---|---|
| *H04L 67/303* | (2022.01) | |
| *G06F 11/34* | (2006.01) | |
| *H04L 9/40* | (2022.01) | |
| *H04L 41/0893* | (2022.01) | |
| *H04L 61/2503* | (2022.01) | |
| *H04L 67/1396* | (2022.01) | |

(Continued)

(52) U.S. Cl.
CPC ............ *H04L 67/303* (2013.01); *G06F 11/34* (2013.01); *H04L 41/0893* (2013.01); *H04L 61/2591* (2025.05); *H04L 63/0876* (2013.01); *H04L 63/10* (2013.01); *H04L 63/102* (2013.01); *H04L 63/104* (2013.01); *H04L 67/1396* (2022.05); *H04L 67/306* (2013.01); *H04L 67/535* (2022.05); *H04L 67/30* (2013.01)

(58) Field of Classification Search
CPC ... H04L 67/303; H04L 67/535; H04L 67/306; H04L 67/1396; H04L 67/30; H04L 61/2591; H04L 63/0876; H04L 63/102; H04L 63/104; H04L 63/10; H04L 41/0893; G06F 11/34
See application file for complete search history.

(56) References Cited

U.S. PATENT DOCUMENTS 10,419,883 B2 *   9/2019   Jenkins ............... H04L 61/5007
10,783,560 B2 *   9/2020   Costache ............. H04L 67/535
(Continued)

OTHER PUBLICATIONS

Tragg V.A., et al., "From Louvain to Leiden: guaranteeing well-connected communities," Scientific Reports, 9:5233; (2019) (Year: 2019).*
(Continued)

*Primary Examiner* — Gregory Todd
(74) *Attorney, Agent, or Firm* — Banner & Witcoff, Ltd.

(57) ABSTRACT

Techniques for identifying a visitor device to a website may include capturing device identification information of the visiting device(s). The identification information may include device fingerprints, cookies, domain user identifications and/or other identifiers (e.g., IP addresses, visiting history, etc.). Based on the device identification information, a device graph including a plurality of nodes may be constructed by associating the devices with nodes and connecting the nodes to form the device graph. A community detection algorithm may be applied to the device graph to determine community information for the nodes. Using the identification information and the community information, visitor profiles may be generated, which may be used to identify visiting devices to the website.

19 Claims, 6 Drawing Sheets

(51) Int. Cl.
    *H04L 67/306*    (2022.01)
    *H04L 67/50*     (2022.01)
    *H04L 67/30*     (2022.01)

(56) References Cited

U.S. PATENT DOCUMENTS

| | | | | |
|---|---|---|---|---|
| 2013/0276115 | A1* | 10/2013 | Hu | G06F 21/552 726/23 |
| 2017/0083941 | A1* | 3/2017 | Biswas | G06Q 30/0275 |
| 2022/0038553 | A1* | 2/2022 | Geffert | G06Q 30/0246 |
| 2022/0247750 | A1* | 8/2022 | Kaidi | G06F 11/3006 |
| 2022/0417334 | A1* | 12/2022 | Rahman | H04L 67/535 |
| 2024/0248971 | A1* | 7/2024 | Rao | G06F 21/34 |

OTHER PUBLICATIONS

Tragg V.A., et al., "From Louvain to Leiden: guaranteeing well-connected communities," Scientific Reports, 9:5233; <https://doi.org/10.1038/s41598-019-41695-z> (2019).

Csardi, G., & Nepusz, T. The igraph software package for complex network research, InterJournal, Complex Systems, 1695; <https://python.igraph.org/en/main/index.html> (2006).

Malloy, M, et al. "Internet Device Graphs," In Proceedings of ACM KDD conference, Halifax, Nova Scotia Canada, KDD 2017; 9 pages; (Aug. 2017).

Blondel, V, Guillaume, J L, Lambiotte, R, Lefebvre, E, "Fast Unfolding of Communities in Large Networks," Journal of Statistical Mechanics Theory and Experiment; (2008).

Newman M E J, "Finding and evaluating community structure in networks," Phys. Rev. E 69 066133; (2004).

Zeng, Jianping et al., "Effectively Unified Optimization for Large-scale Graph Community Detection," IEEE International Conference on Big Data (Big Data); <https://par.nsf.gov/servlets/purl/10163131>; (2019).

Amy Hodler and Sören Reichardt, "Predicting Influence and Communities Using Graph Algorithms," Presentation on May 6, 2019 at the Spark + AI Summit 2019; <https://www.youtube.com/watch?v=MTnozZ5Cy0E&t=15s>; (2019).

\* cited by examiner

SYSTEMS AND METHODS FOR VISITOR IDENTIFICATION USING DEVICE GRAPHS AND COMMUNITY DETECTION

FIELD OF USE

Aspects of the disclosure relate generally to the identification of visitors to a website, including using identity graphs and community detection techniques to identify the visitors to the website.

BACKGROUND

The widespread use of the internet has led to a growing need for websites to understand and analyze user behavior. Website tracking may use cookies, which are small text files stored on a user's device when they visit a website.

User registration systems require users to create an account to access certain features or content on the website. This allows the website to identify and track users regardless of their cookie settings. However, this approach may not be suitable for all types of websites, and may limit the tracking and identification of users who prefer not to register. Further, the tracking of visitors is becoming more challenging with the increase in the use of cooking blocking technologies. Such challenges make the tracking of websites more difficult, especially for unauthenticated website visitors who prefer not to register or log in.

Aspects described herein may address these and other problems, and generally improve the quality, efficiency, and speed of visitor identification by leveraging identity graphs and community detection techniques.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein generally improve the identification of website visitors using deterministic and probabilistic matching. The identification of visitors may utilize identifiers to construct device graphs to improve identification of unknown visitors by determining community information for nodes of the device graph, using one or more community detection algorithms. The community information may be used to determine the modulatory of the nodes within the device graph. By leveraging the identifiers and community information, aspects of the present disclosure improve the identification of visitors, particular for unauthenticated visitors by associating the community information with one or more identifiers, such as device fingerprints. With the improved identification of visitors, aspects of the present disclosure can provide a more personalized experience for website visitors that is more tailored to their individual requirements and expectations, and/or increase engagement. These features, along with many others, are discussed in greater detail below.

A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. As such, corresponding apparatus, systems, and computer-readable media are also within the scope of the disclosure.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for improving the identification of visitors to a website, including using identity graphs and community detection techniques to identify the visitors to the website. Conventional website tracking typically involves the use of cookies and are becoming increasingly limited in successfully identifying visitors as cookie blocking techniques gain more widespread use. The limitations of conventional indication techniques are particularly evident when used in unauthenticated sessions, which may make up a significant portion of the website traffic. For example, nearly half of a website's traffic may include unauthenticated visitors who are not logged in during visits, and these visitors may not have an associated cookie and/or other trackable identifier used to identify the respective visitor. In particular, tracking techniques are increasingly blocked or limited by browser settings or privacy extensions. For example, such applications allow the user to block or delete cookies, as well as block web beacons and other analytics software. Device fingerprints are also increasingly limited by privacy extensions of browsers. Consequently, such conventional techniques impact web analytics and marketing analysis, as well as limit the website's ability to offer a personalized and tailored experience for return visitors.

Aspects described herein generally improve the identification of website visitors using deterministic and probabilistic matching. The identification of visitors may utilize device identifiers (e.g., Internet Protocol (IP) address, device fingerprints, domain IDs) and/or cookies (e.g., high-confidence cookie generated from a previous authenticated session, such as a universal marketing key) to determine a collection of identifiers. The collection of identifiers may be used to construct a device graph having a series of nodes, each representing a visiting device, and each connectable to one or more other nodes based on one or more the identifiers (e.g., based on a function of a respective IP address and one or more cookies, such as a universal marketing key).

One or more community detection algorithms (e.g., Louvain, Leiden, etc.) may be used to determine the modularity of nodes within the device graph and associated community information for the nodes. The identifiers and community information may then be used to generate visitor profiles of the website visitors. For example, the community information may be associated with one or more identifiers of the respective device(s). With the improved identification of visitors, aspects of the present disclosure can provide a more personalized experience for website visitors that is more tailored to their individual requirements and expectations.

Figure 1:
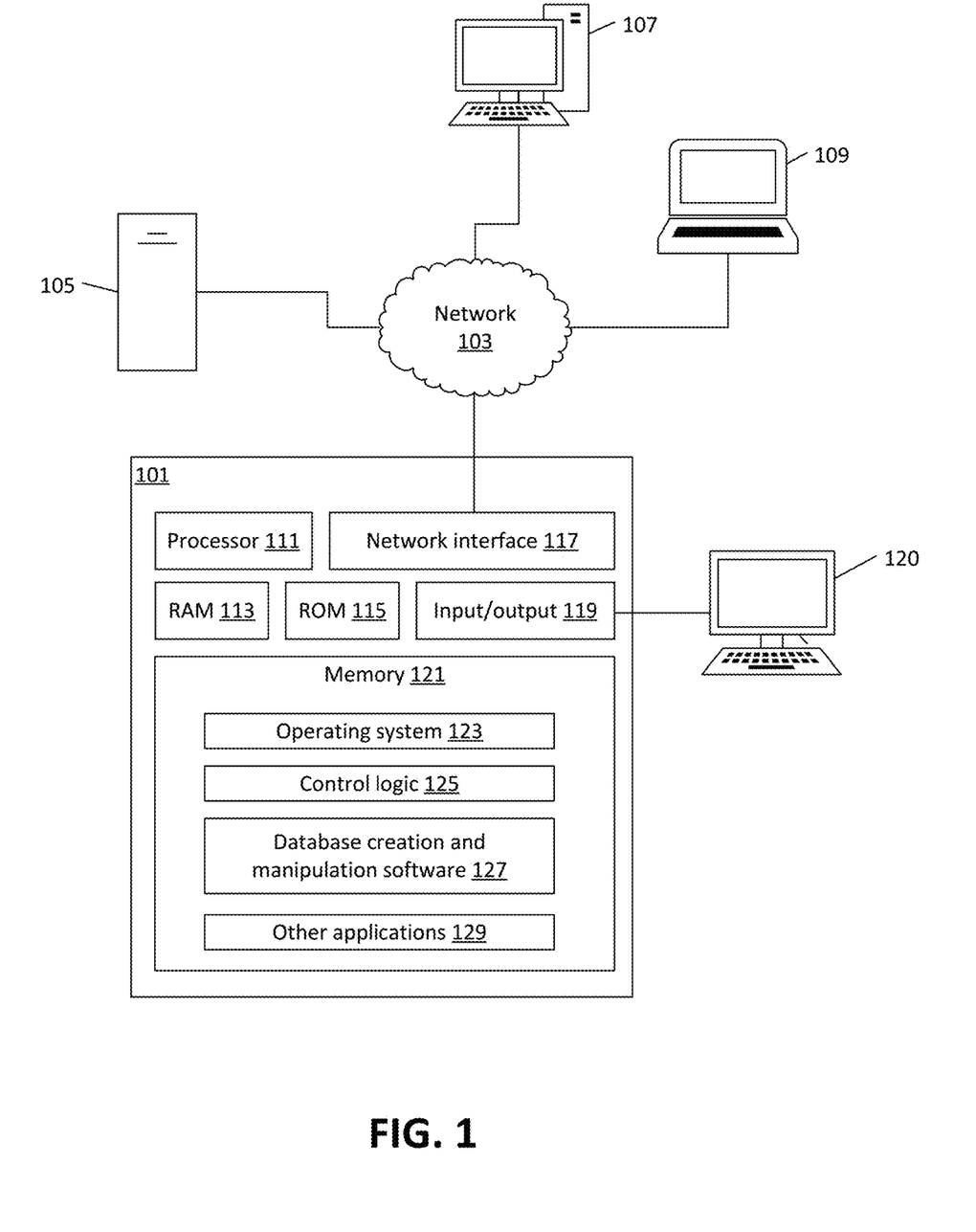
FIG. 1 shows an example computing device in accordance with one or more aspects described herein.

Before discussing the concepts of the disclosure in greater detail, however, several examples of a computing device that may be used in implementing and/or otherwise providing various aspects of the disclosure will first be discussed with respect to FIG. 1. FIG. 1 illustrates one example of a computing device 101 that may be used to implement one or more illustrative aspects discussed herein. For example, the computing device 101 may, in some aspects, implement one or more aspects of the disclosure by reading and/or executing instructions and performing one or more actions based on the instructions. In some aspects, the computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing device 101 may, in some aspects, operate in a standalone environment. In others, the computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, local area networks (LANs), wireless networks, personal area networks (PANs), and the like. Network 103 is for illustration purposes and may be replaced with fewer or additional computer networks. A LAN may have one or more of any known LAN topologies and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media. Additionally, or alternatively, the computing device 101 and/or the network nodes 105, 107, and 109 may be a server hosting one or more databases. Databases may include, but are not limited to relational databases, non-relational databases, hierarchical databases, distributed databases, in-memory databases, flat file databases, XML databases, NoSQL databases, graph databases, and/or a combination thereof.

As seen in FIG. 1, the computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. Input/output 119 may include a variety of interface units and drives for reading, writing, displaying, and/or printing data or files. Input/output 119 may be coupled with a display such as display 120. Memory 121 may store software for configuring computing device 101 into a special purpose computing device in order to perform one or more of the various functions discussed herein. Memory 121 may store operating system software 123 for controlling overall operation of the computing device 101, control logic 125 for instructing the computing device 101 to perform aspects discussed herein, database creation and manipulation software 127 and other applications 129 (e.g., identification applications, community detection applications configured to implement one or more community detection algorithms). Control logic 125 may be incorporated in and may be a part of database creation and manipulation software 127. In other aspects, the computing device 101 may include two or more of any and/or all of these components (e.g., two or more processors, two or more memories, etc.) and/or other components and/or subsystems not illustrated here.

Devices 105, 107, 109 may have similar or different architecture as described with respect to the computing device 101. Those of skill in the art will appreciate that the functionality of the computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

The data transferred to and from various computing devices may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many aspects, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python, JavaScript, or an equivalent thereof. The computer executable instructions may be stored on a computer readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product. Having discussed several examples of computing devices which may be used to implement some aspects as discussed further below, discussion will now turn to a method for classifying textual data using a machine-learning classifier.

Figure 2:
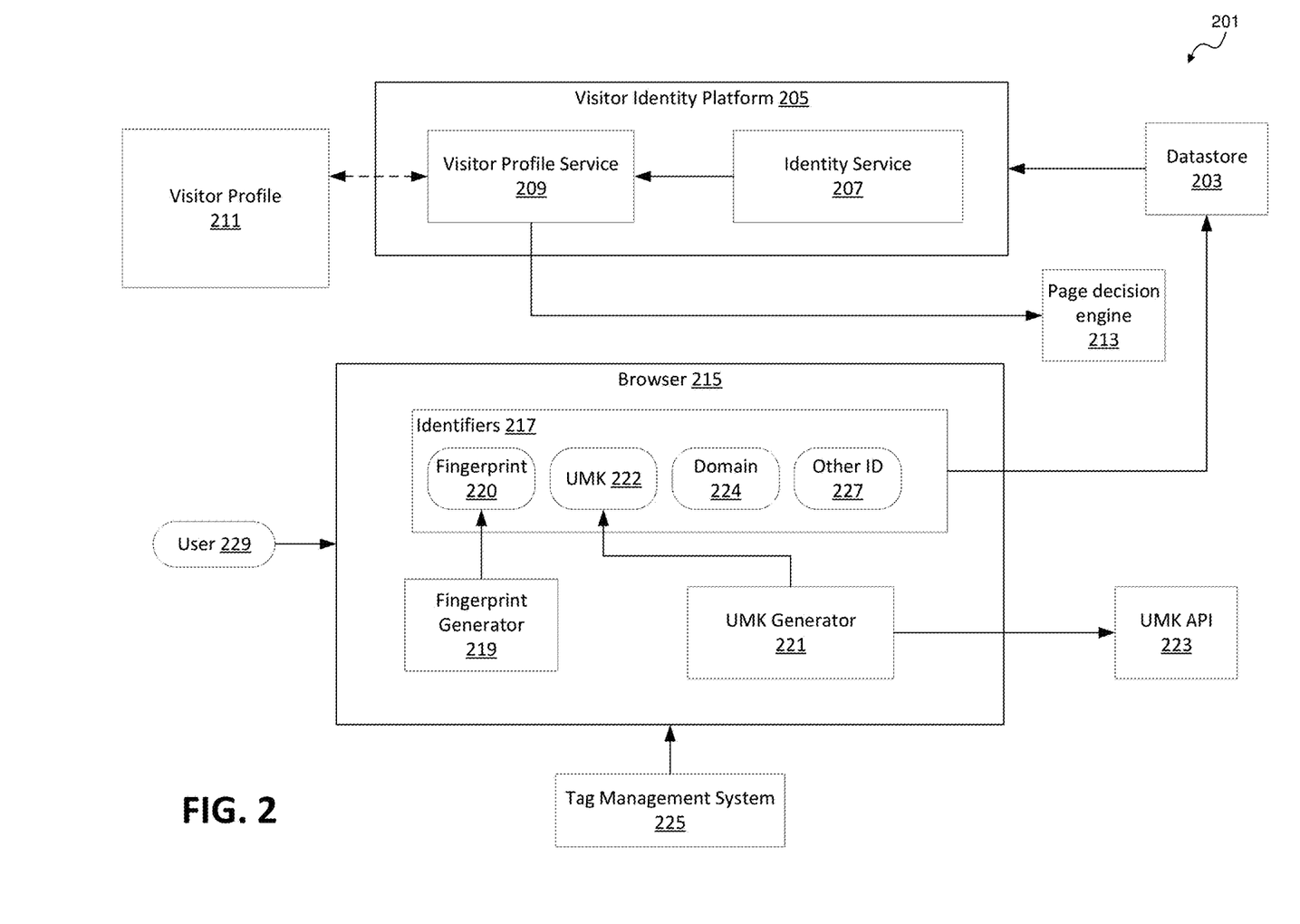
FIG. 2 shows an example computing environment in which one or more aspects described herein may be implemented.

FIG. 2 is a block diagram of an environment 201 in which one or more aspects described herein may be implemented. As shown in FIG. 2, the environment may include a visitor identity platform (VIP) 205 that may be configured to track and identify visitors (e.g., user 229) of a website accessed by browser 215. For example, the VIP 205 may be implemented by computing device 101 while the browser is implemented by a remote computing device, such as device 105, 107, and/or 109. The VIP 205 and browser 215 may be implemented by the same computing device. The environment 201 may further include a datastore 203, visitor profile(s) 211, a page decision engine 213, and/or tag management system 225. The various components within the environment 201 may be implemented by different computing devices, or two or more components may be implemented by the same computing device. One or more components with the environment may be implemented across two or more computing devices. The visitor profile(s) 211 may be stored in an internal memory 121 of device 101 and/or in one or more external memory units (e.g., memory of one or more other devices 105, 107, 109, and/or one or more datastores).

Browser and Operation

The user 229 may access a website using browser 215. When the user 229 accesses the website, the browser 215 may be configured to send a request to a server hosting the website. The host server may be implemented by one or more of the network nodes 105, 107, and 109 and/or other computing device connected to the network 103. The host server may respond by sending back a web page of the website along with any associated resources (e.g., text, images, video, and/or scripts). The host server may also generate and provide one or more identifiers associated with the user 229, browser 215, and/or the user device accessing the website. The browser 215 may store the received identifiers as identifiers 217 on the user device supporting the browser application and/or on one or other external devices. Additionally, or alternatively, the user device may generate one or more identifiers based on device information of user device, user information, and/or information provided to the user device by the host server.

For example, the generated identifiers 217 may be stored in a datastore 203, which may be accessible by the VIP 205. The datastore 203 may be embodied in one or more external devices (e.g., devices 105, 107, and 109) and/or in the device 101 along with the VIP 205. The datastore 203 may be a database and embodied as a memory in one or more of external devices. Additionally, or alternatively, the identifiers 217 may be directly stored in the VIP 205 (e.g., in an internal memory of device 101) and/or the VIP 205 may access identifiers 217 stored by the browser 215 in the user device (e.g., in the internal memory of device(s) 105, 107, and/or 109 implementing the browser 215). The VIP 205 may be configured to track and identify visitors (e.g., user 229) of the website accessed by browser 215 based on the identifiers 217, and generate one or more visitor profiles 211 based on the identifiers 217.

For example, the identifiers 217 may include, one or more device fingerprints 220, one or more cookies (e.g., UMK) 222, one or more domain user identifications (DUID) 224, and/or one or more other identifiers 227, such as cookies, tags, profile reference identification(s) (PRIDs), Enterprise customer service identification(s) (ESCIDs), market segment(s), product(s), network location information (e.g., IP address(es), media access control (MAC) address(es), etc.), geolocation information of the device accessing the website, visit history (e.g., temporal information such as date(s) and/or time(s) in which the website was accessed), and/or customer reference identification(s). The identifiers 217 may be generated by the host server, the user device implementing the browser 215, and/or one or more other devices and/or applications.

The browser 215 may store one or more cookies, which may include a cookie associated with one or more previous authenticated sessions in which the user 229 accesses the website. These cookies associated with the previous authenticated session(s) may be referred to as a universal marketing key (UMK) 222 or a high-confidence cookie. The UMKs 222 may offer a higher confidence for identifications compared to a cookie generated based on an unauthenticated session. Authenticated sessions may be established using, for example, a user registration process that requires users to create an account (e.g., username and password) to access certain features and/or content on the website.

For example, the browser 215 may include a UMK generator 221 that is configured to generate one or more UMKs 222 based on one or more authenticated session(s) of visitor(s) to a website. For example, the UMK generator 221 may generate one or more UMKs 222 based on the user 229 visiting and engaging in an authenticated session (e.g., registering and/or logging in) during their visit to the website using the browser 215. The UMK generator 221 may be configured to access a user registration system (e.g., associated with the developer of the website) to facilitate the registration of the user and/or the authentication of the session. In response to the registration and/or authentication, the UMK generator 221 may generate or otherwise provide UMK 222. The access to the user registration system may use an application programming interface (API), such as UMK API 223, which may be configured to facilitate access to one or more resources of the website developer and/or other entity associated with the website. Additionally, or alternatively, the UMK generator 221 may be implemented in one or more other devices, such as device 101 and/or the server of the website.

A device fingerprint may identify the user device, and in some cases may uniquely identify the user device. The fingerprint may be generated based on device information (e.g., operating system information, screen resolution information, installed fonts, device and/or component manufacture information, such as the device serial number, manufacture date, manufacture location, etc.), browser information (e.g., browser type, one or browser settings, browser version information, etc.), and/or other device hardware and/or software information (e.g., processor information, memory information, storage information, etc.). Additionally, or alternatively, the identifiers 217 may include network location information, such as one or more IP addresses, one or more MAC addresses, temporal information (e.g., date(s) and/or time(s) in which the website was accessed), geolocation information of the device accessing the website, or the like. Such information may additionally or alternatively be included in the device fingerprint 220. For example, the browser 215 may include a fingerprint generator 219 that is configured to generate one or more device fingerprints 220 associated with the user device.

The tag management system 225 may be configured to manage and deploy various tracking tags and scripts to a website. Tags may include a small quantity of code that allow website developers and/or owners to track user behavior, such as how users interact with the site, which pages they visit, and what actions they take. In one or more aspects, the tags may include web analytics tracking tags, advertising and retargeting tags, social media tracking tags, and the like. The tag management system 225 may facilitate the process of adding, removing, and updating tags on the website without requiring modifications to the underlying code of the website. The identifiers 217 (e.g., other identifications 227) may include one or more tags from the tag management system 225. The tag management system 225 may be implemented by a remote computing device, such as device 105, 107, and/or 109. In one or more other aspects, the tag management system 225 may be implemented by computing device 101.

VIP and Operation

The visitor identity platform (VIP) 205 may be configured to track and identify visitors (e.g., user 229) of the website accessed by browser 215. The VIP 205 may access the datastore 203 to obtain one or more identifiers 217. Additionally, or alternatively, the VIP 205 may obtain one or more identifiers 217 from the device 101, from the device in which the browser 215 is operating, and/or from one or more other devices. The VIP 205 may be configured to identify one or more visitors based the identifier(s) 217.

The VIP 205 may be configured to generate one or more visitor profiles 211, which are associated with the identified visitors. For example, the visitor profile(s) 211 may be generated based on one or more identifiers 217, device fingerprints, community information (e.g., a detected community for the visitor), network location information (e.g., IP address(es)), temporal information (e.g., date(s) and/or time(s) in which the website was accesses), geolocation information of the device accessing the website, one or more tags generated by the tag management system 225, and/or other information associated with the visitor and/or visiting device. The community information may be determined (e.g. by the community detector 305) using one or more community detection algorithms as described in more detail below with reference to FIGS. 3-5.

Figure 4:
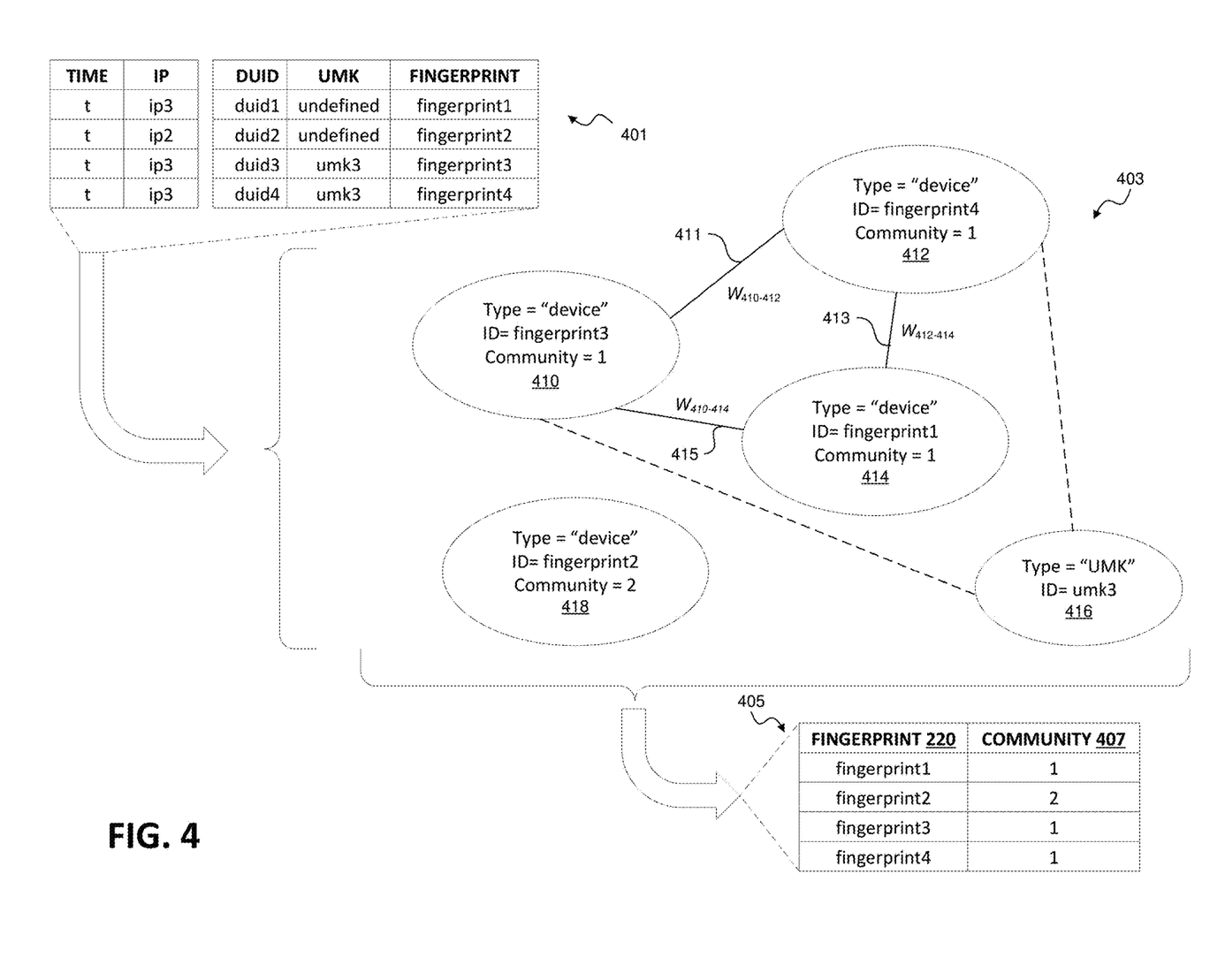
FIG. 4 shows an example community detection process according to one or more aspects of the disclosure.
Figure 5A:
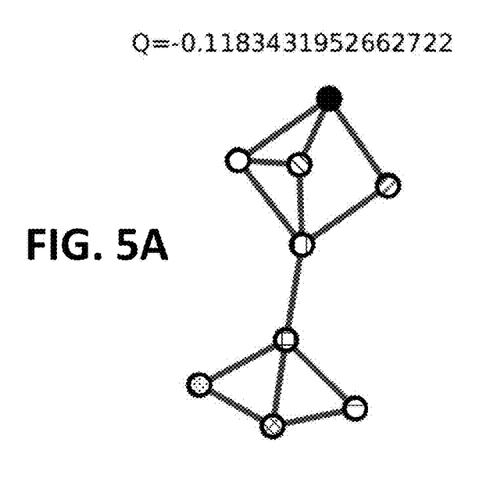
FIG. 5A show an example modularity score according to one or more aspects of the disclosure.
Figure 5B:
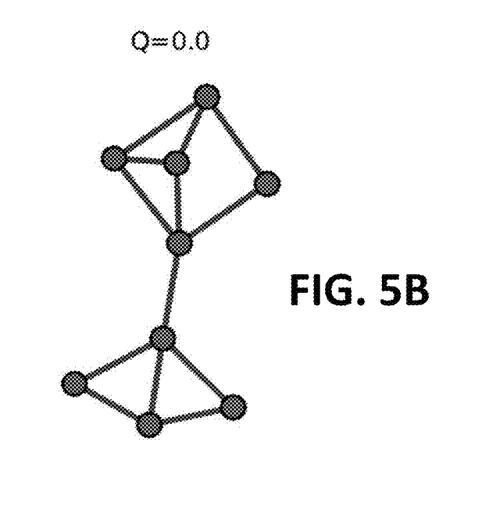
FIG. 5B show an example modularity score according to one or more aspects of the disclosure.
Figure 5C:
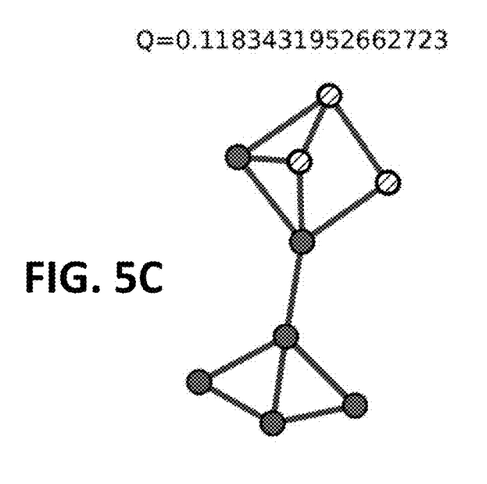
FIG. 5C show an example modularity score according to one or more aspects of the disclosure.
Figure 5D:
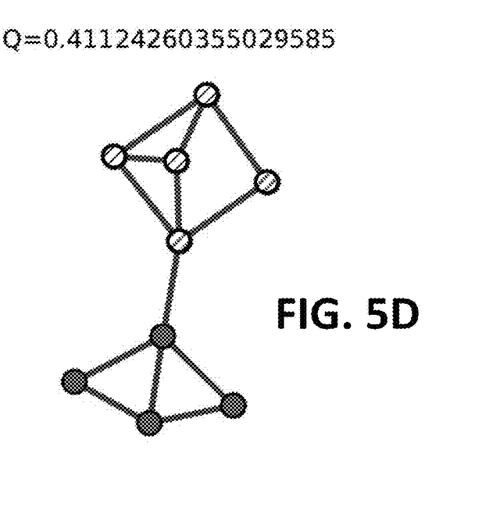
FIG. 5D show an example modularity score according to one or more aspects of the disclosure.

The respective visitor profiles 211 may be configured to associate the visitors with: community information of the respective visitors and/or visitor devices, the one or more identifiers 217, device fingerprints, network location information (e.g., IP and/or MAC addresses), temporal information (e.g., visit history, such as date(s) and/or time(s) in which the website was accessed), geolocation information (e.g., wireless triangulation data, GPS data from a GPS module, etc.), one or more tags (e.g., web analytics tracking tags, advertising and retargeting tags, social media tracking tags, and/or other tracking tags), and/or other information. For example, the community information of the respective visitors and/or visitor devices may be associated with: the one or more identifiers 217, device fingerprints, network location information, temporal information, geolocation information, one or more tags, and/or other information. For example, as illustrated in FIG. 4, the visitor profile 405 associates one or more respective fingerprints 220 with community information 407. The visitor profile 211, 405 may be, for example, a look-up table (LUT). In one or more aspects, the visitor profile(s) 211 may be a structured database.

The VIP 205 may include an identity service 207 and a visitor profile service 209. The identity service 207 may be configured to track and identify visitors (e.g., user 229) of the website accessed by browser 215 based on, for example, identifier(s) 217. The identity service 207 may probabilistically match visitor browsers (e.g., fingerprints 220) to a prospective user and/or customer.

The visitor profile service 209 may be configured to generate one or more visitor profiles 211 based on the visitors identified by the identity service 207. The visitor profile service 209 may publish visitor attributes, such as the visitor profiles 211 to a page decision engine 213. The page decision engine 213 may be configured to determine a best possible page or content to display to a website visitor based on the visitor attributes and/or other information (e.g., behavior, preferences, etc.). The page decision engine 213 may determine the most relevant content, product recommendations, or calls to action based on the visitor's needs and interests that may be determined from the visitor attributes. The page decision engine 213 may be implemented by a remote computing device, such as device 105, 107, and/or 109, but is not limited thereto.

Figure 3:
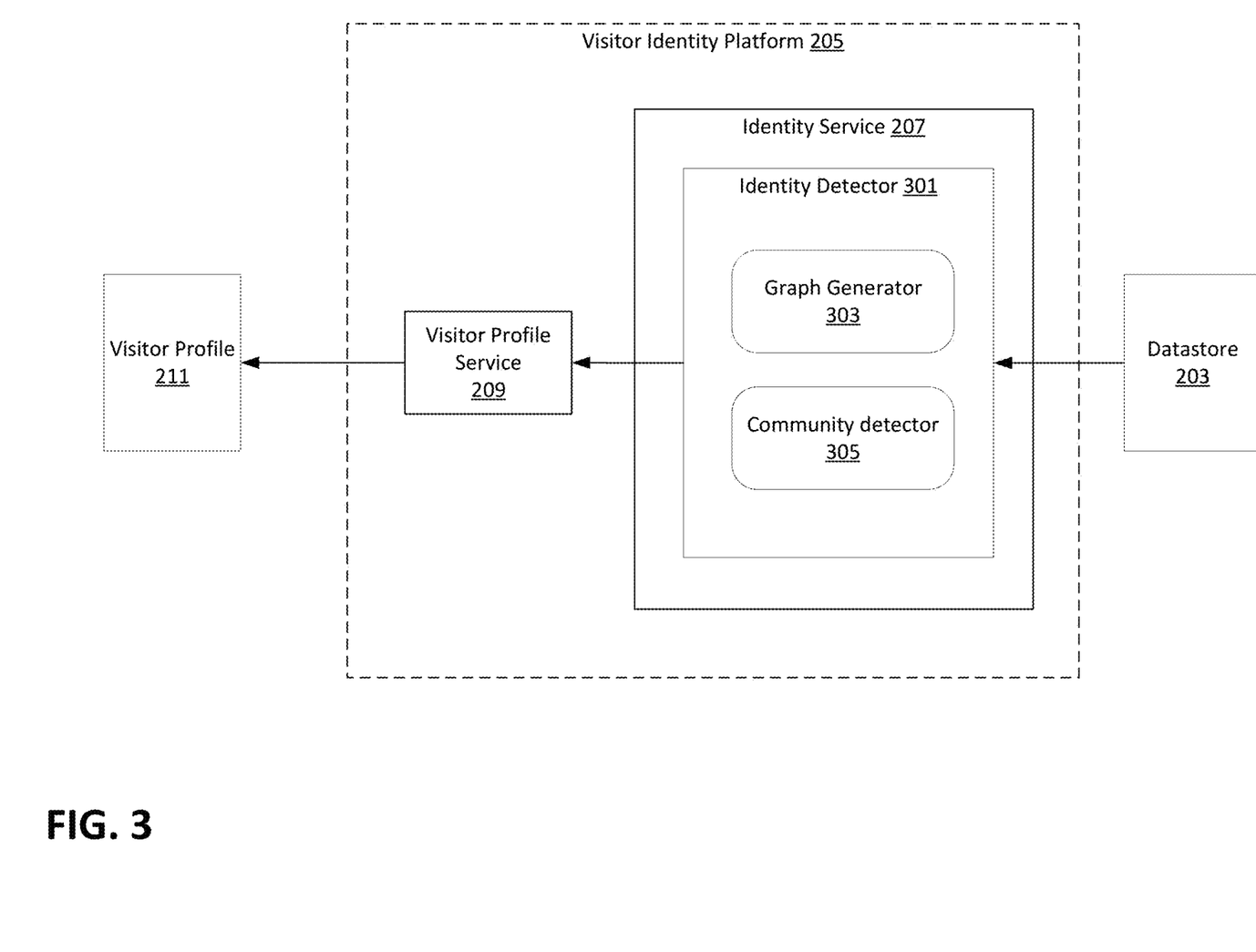
FIG. 3 shows an example visitor identity platform according to one or more aspects of the disclosure.

Turning to FIG. 3, an example visitor identity platform (VIP) 205 is illustrated. As illustrated in FIGS. 2 and 3, the VIP 205 may include identity service 207 and visitor profile service 209. The identity service 207 may include an identify detector 301, which may include a graph generator 303 and community detector 305. The graph generator 303 of the identity detector 301 may be configured to generate a device graph using one or more identifiers 217 and/or using community information determined by the community detector 305. The device graph may also be referred to as an internet device graph or an identity graph. In constructing the device graph, the graph generator 303 may selecting two or more devices from a collection of identified devices (e.g. from a database including device visitation information). The devices may be selected based on one or more identifiers 217, such as based on corresponding website access times of the devices. For example, the graph generator 303 may select devices that have visited the website within a defined time period and/or based on the frequency of the visitations. The graph generator 303 may then associate the selected devices with respective nodes. The nodes may then be connected together by the graph generator 303 using one or more the identifiers 217 (e.g., based on a function of a respective IP address and one or more cookies, such as a universal marketing key).

The community information may include community index score(s), modularity score(s), and/or one or more identified communities. The VIP 205 may be implemented by computing device 101. For example, the VIP 205 may be implemented by processor 111. The identity service 207, identify detector 301, graph generator 303, and/or community detector 305 may be program modules (e.g., stored in memory 121), which may be executed by the processor 111 to perform the functions of the respective components. while the browser is implemented by a remote computing device, such as device 105, 107, and/or 109.

Device Graph Generation

With reference to FIG. 4, the graph generator 303 may generate the device graph 403 based on, for example, identification information 401 associated with the visiting device(s). The identification information 401 may be in the form of a tuple (T) and may include one or more identifiers 217, such as fingerprint(s) 220, UMK(s) 222, domain user identification(s) (DUIDs) 224, and/or one or more other identifiers (e.g., temporal information, such as visit history, which may include date(s) and/or time(s) of visits to the website, and/or network location information, such as IP address(es)). In this example, the input tuple ($T_{in}$) may be (time-epoch, IP address, DUID, UMK, fingerprint). In one or more aspects, the identification information 401 may include additional or alternate identifying information or data.

The graph generator 303 may be configured to associate identified visiting devices with corresponding nodes 410-418, and connect the nodes to construct and/or update the device graph. For example, two or more nodes may be connected by an edge if there is a sufficient association between the two nodes. The association between the nodes may be determined based on the identification information 401 (e.g., IP address co-location, and/or sign-in by the same customer (e.g., as indicated by UMKs 222), etc.). The graph generator 303 may determine weights w between pairs of nodes. The connection 411, 413, 415 of the nodes may be based on the determined weights in one or more aspects.

The graph generator 303 may determine the weights based on one or more identifiers 217 and/or one or more other identifying information (e.g., network location addressing information, such as IP address(es)). For example, the weight(s) may be determined as a function of one or more identifiers 217, such as one or more UMKs 222, IP addresses of the devices represented by the nodes of the device graph 403, and/or temporal information (e.g., website access times of the devices, such as access of the devices within a predetermined time period). The identification information 401 in the example illustrated in FIG. 4 includes a UMK 222 (having an identifier value of "umk3") that is common to the devices (nodes 410 and 412) having fingerprints 220 with identifier values of "fingerprint3" and "fingerprint4." The UMK is identified by node 416. With this common UMK 222, the node pair 410-412 will have a higher weight $w_{410\text{-}412}$ as compared to the weights for the node pairs 410-414 and 412-414. In this example, leveraging one or more UMKs 222 in determining the weights advantageously improves the identification and community detection of the various nodes and provides an increased confidence for the established connections and determined communities. The UMK (node 416) may be associated with nodes 410 and 412 due to, for example, the devices corresponding to nodes 410 and 412 having previously visited the website using one or more authenticated sessions.

In one or more aspects, the weight of a node pair may be determined based on identifiers 217 that are associated with a common network address (e.g., IP address). For example, the weight between two devices sharing a common IP address may be determined based on the following equation:

$$\text{weight} = \frac{1}{IP_N}$$

where $IP_N$ is the total number of unique device IDs having the common IP address. In an exemplary aspect, the determination of the common IP address may be based on the commonality within a predetermined time period.

As discussed above, the weight of a node pair may be influenced by one or more associated UMKs 222. For example, the weight determined above may be adjusted based on a UMK factor. In one or more aspects, the UMK factor may be an additive factor or a multiplication factor. For example, the weight may be adjusted based on the following equation:

$$\text{weight}_{adj} = \text{weight} + UMK_f$$

where $\text{weight}_{adj}$ is the adjust weight, and $UMK_f$ is the UMK factor.

In one or more aspects, additional identification information may contribute more weight to an edge. For example, if two nodes were observed at the same IP address over multiple time epochs, the edge between them may be assigned more weight. Since authentication is generally a much stronger indicator (except when the visit came from an IP address shared by many visitors), a single customer signing in from two nodes may contribute even greater weight to the edge. For example, with reference to FIG. 4 and the above equations, the edge (e.g., adjusted weight) between two nodes representing fingerprint 3 and fingerprint 4 will be the sum of ⅓ (e.g., based on 3 fingerprints from ip3) and a parameterized authentication constant (e.g., $UMK_f$).

In one or more aspects, the graph generator 303 may generate the device graph 403 using an identification and weighting algorithm. Example pseudocode of an identification and weighting algorithm is provided below, which may be used by the graph generator 303 to generate the device graph 403.

TABLE 1 identification and weighting algorithm

```
G = device graph
V = nodes in G
E = edges in G
B = input batch, 0+ (IP address, device ID, UMK)
maxN = maximum number of device IDs observed on a visitor IP address
maxU = maximum number of UMKs observed on a visitor IP address
multiU = multiplication factor for an edge between device nodes on the
same UMK
minEdgeWeight = minimum edge weight between visitor device nodes
function Update(G, B, maxN, maxU, multiU, minEdgeWeight):
for each unique device ID i in B
  if i not in G
  add new device node to G (type = "device", id = i)
  add self edges of weight 1.0 to each new node # small communities
    for each unique IP address k in B
  ipN = total number of unique device IDs on IP address
  if ipN ≤ maxN
  for each unique device node pair (i, j) on k
    if i != j
    E[i, j]["weight"] += 1 / ipN
      for each unique UMK u in B
        if u not in G
          add new UMK node to G (type = "umk", id = u)
        uN = total number of unique device IDs on UMK
        if uN ≤ maxU
          for each unique device node i on u
            add E[u, i] to G if E[u, i] not in G
            for each j in neighbors(u, type = "device"), j != i
              add E[i, j] to G if E[i, j] not in G
              E[i, j]["weight"] += multiU
# prune E: keep edges b/w UMK and device nodes, without an edge
weight
E = {(i, j, w[i, j]): w[i, j] is null or minEdgeWeight < w[i, j]}
return G
```

The graph generator 303 may determine a tuple ($T_{pair}$) for pairs of nodes based on the identification information 401. For example, for a pair of nodes, the tuple may include: a device type of the first node of the pair, a device type of the second node of the pair, and the determined weight of the connected pair (e.g., $T_{pair, 1-2}$=[devicetype1, devicetype2, $w_{1-2}$]). The various tuples may be used by the graph generator 303 to construct the device graph 403. For example, to construct the device graph 403, the graph generator 303 may use one or more big data processing applications (e.g., Spark, Elastic MapReduce, etc.) and/or one or more machine-learning (ML) models.

Community Detection

The community detector 305 may determine community information based on the device graph using one or more community detection algorithms. For example, the community detector 305 may be configured to update the device graph 403 with community information by applying one or more communication detection algorithms (e.g., Louvain, Leiden, etc.) to the device graph 403 generated by the graph generator 303. The updated device graph 403 may be used to determine one or more visitor profiles.

The community detection algorithm(s) may be configured to identify subgroups of the nodes of the device graph 403, which may include identifying the subgroups that are more densely connected to each other than to the rest of the nodes in the network. These subgroups may be referred to as "communities," and the community detection algorithm(s) may partition the network into these communities to reveal the structure of the networks and the relationships between their nodes. The community detection algorithms may include, for example, the Louvain algorithm, Leiden algorithm, Girvan-Newman algorithm, Infomap algorithm, Label propagation algorithm, the Spectral clustering algorithm, Walktrap algorithm, Leading eigenvector algorithm, and/or one or more other community detection algorithms. For example, one or more tuples for the node pairs may be provided to the community detection algorithm and used to determine the updated device graph.

In one or more aspects, the community detection algorithm may take the device graph 403 as input and return a configuration of partitions of nodes that maximizes the cohesiveness for the entire graph 403. For example, the Louvain algorithm maximizes Modularity Score (Q). The modularity score may be determined based on the following equation:

$$Q = \frac{1}{2m}\sum_{i,j}\left[A_{ij} - \frac{k_i k_j}{2m}\right]\delta(c_i, c_j)$$

where 2m is the sum of the weights of all edges, $A_{ij}$ is the weight/strength of the edge between nodes i and j, $k_i k_j$ is the expected weight/strength of an edge between nodes i and j where i edges can randomly connect to j edges, and $C_i$, $C_j$ are communities of nodes i and j, and where $\delta$=0 if $C_i \neq C_j$; otherwise $\delta$=1.

In another example, the Leiden algorithm may be configured to maximize either Modularity score or Constant Potts Model (CPM). Both Louvain and Leiden algorithms try different partitioning on nodes (devices) to determine if the overall quality of the graph can be improved. The algorithms may terminate if they determine no additional improvement can be made.

The community information generated by the communication detection algorithm may include one or more modularity scores. FIGS. 5A-5D illustrate example device graphs and correspond modularity scores (Q) that may be generated by the community detection algorithm (e.g., Louvain algorithm and/or Leiden algorithm). In these examples, the community detection algorithm places the nodes into communities, and then scores the communities based on how closely connected nodes are within the community versus how well they are connected outside. This scoring may be represented by a modularity score Q. FIGS. 5A-5D illustrate connected node structures having modularity scores of approximately Q=−0.118, 0.0, 0.118, and 0.411, respectively. The score Q=0.0 represents a node structure forming a single community.

The identity detector 301 may provide the updated device graph to the visitor profile service 209, which may be configured to determine one or more visitor profiles 211 (405 in FIG. 4) based on the updated device graph. As illustrated in FIG. 4, the visitor profile 211 may be configured as a LUT 405 that associate the community information (e.g., identified communities 407) with device fingerprints 220. For example, the visitor profile service 209 may process data from the updated device graph to convert the data into a LUT. In one or more aspects, the visitor profile 211, 405 may associate the community information with one or more additional or alternate identifiers 217 and/or other identification information. Using the visitor profile(s) 211, the VIP 205 may advantageously improve the identification of one or more visitor devices (e.g., user 229) that have accessed a website. In one or more aspects, the updated device graph may be represented by respective tuples that associate the community information with a respective device fingerprint (e.g., T=(fingerprint1, 1)).

Figure 6:
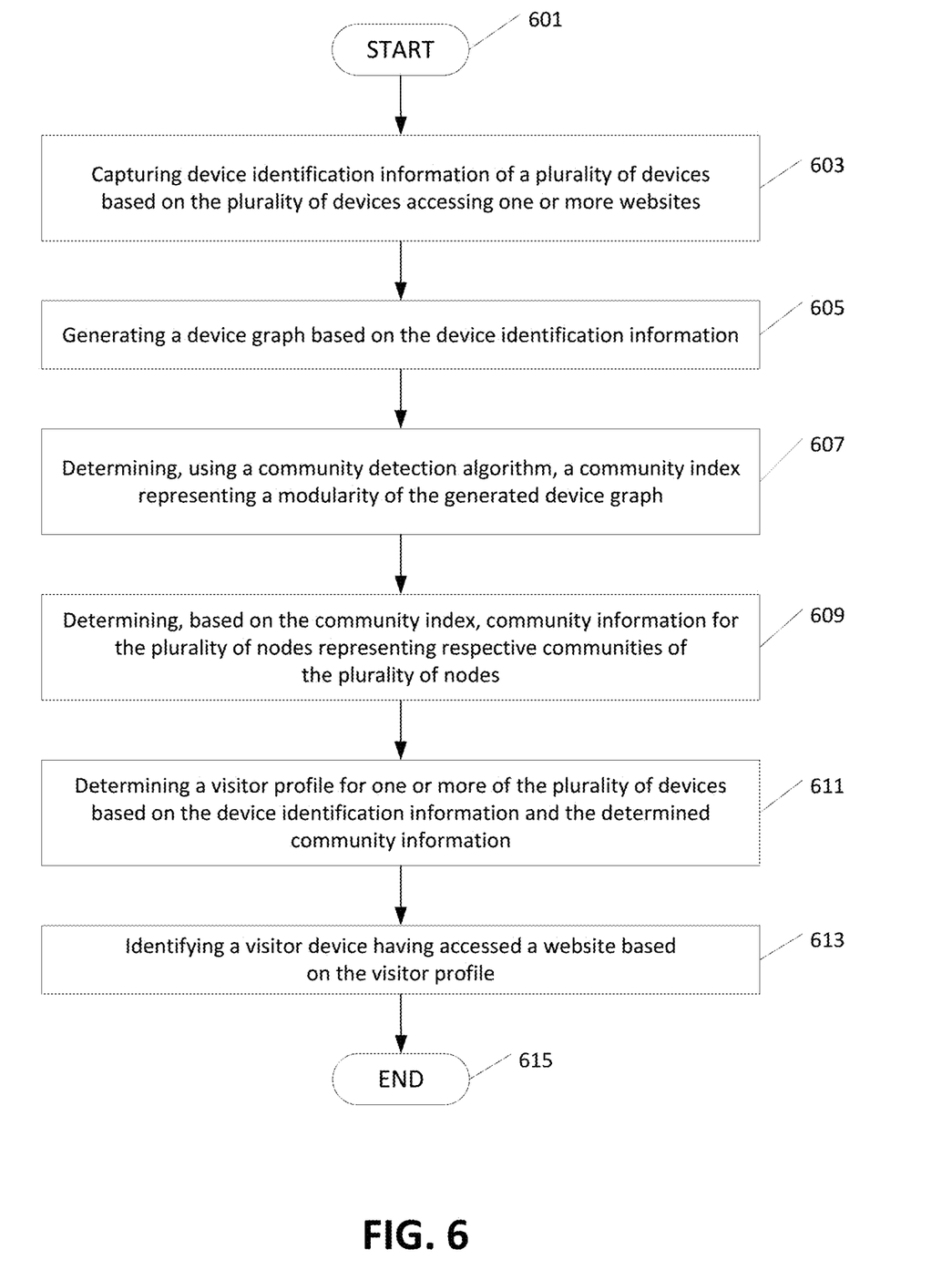
FIG. 6 shows a flowchart of a method for identifying a visitor according to one or more aspects of the disclosure.

FIG. 6 shows a flow chart of a process 600 for identifying a visitor device according to one or more aspects of the disclosure. Some or all of the operations of process 600 may be performed using one or more computing devices as described herein.

The process begins at operation 601 and transitions to operation 603, where device identification information of a plurality of devices may be captured based on the plurality of devices accessing one or more websites. For example, the identity detector 301 may capture device identification information (e.g., identifiers 217) of one or more devices accessing the website(s). One or more identifiers 217 associated with the user 229 and/or the device of the user may be generated by the host server. The identifier(s) 217 may be provided to the browser 215. The browser 215 may store the received identifiers 217 on the user device. The device identification information may include one or more IP addresses of the devices and/or one or more cookies (e.g. UMK) associated with previous authenticated sessions of the devices of the respective pairs of connected nodes. Additionally, or alternatively, the device identification information may include one or more device fingerprints of one or more of the devices, website access times of the plurality of devices, and/or one or more domain user identifications.

At operation 605, a device graph may be generated based on the device identification information. For example, the graph generator 303 may generate the device graph based on the device identification information (e.g., identifier(s) 217). The device graph may include a plurality of nodes and the graph generator 303 may associate the plurality of identified visiting devices with plurality of nodes, and connect the plurality of nodes to form the device graph. The nodes may be connected to construct and/or update the device graph.

As part of operation 605, the graph generator 303 may determine weights between pairs of the nodes. For example, the graph generator 303 may determine a weight for each pair of connected nodes of the plurality of nodes. The weight for one or more pairs of connected nodes may be determined based on one or more cookies (e.g., UMK) and/or based on the IP addresses of the respective devices.

As part of operation 605, the graph generator 303 may select two or more devices from a collection of identified devices. The devices may be selected based on one or more identifiers 217. For example, the graph generator 303 may select devices from the visiting devices based on corresponding website access times of the plurality of devices. The graph generator 303 may associate the selected devices with the plurality of nodes.

At operation 607, a community index representing a modularity of the generated device graph may be determined using a community detection algorithm. For example, a community detection algorithm (e.g., Louvain algorithm, Leiden algorithm) may be applied to the constructed device graph to determine a modularity score of the device graph, as the community index. In operation 607, the community detector 305 may determine, using a community detection algorithm, a community index representing a modularity of the generated device graph.

At operation 609, community information for the plurality of nodes representing respective communities of the plurality of nodes may be determined based on the community index. For example, the community index (e.g., modularity score) may be used to identify corresponding communities of the nodes of the device graph. In one or more aspects, the device graph may be updated based on the community information. In operation 609, the community detector 305 may determine community information (e.g. one or more communities) based on the device graph using one or more community detection algorithms. For example, the community detector 305 may be configured to determine the community information for the nodes based on the community index. The community detector 305 may be configured to update the device graph (generated by the graph generator 303) based on the community information to generate an updated device graph. The community detector 305 and the graph generator 303 may collectively generate the updated device graph. For example, the community detector 305 may provide the community information to the graph generator 303, and the graph generator 303 may be configured to update the previously generated device graph. The updated device graph may then be used to determine one or more visitor profiles.

At operation 611, a visitor profile for one or more of the plurality of devices may be determined based on the device identification information and the determined community information. For example, the visitor profile service 209 may be configured to determine the visitor profile based on device identification information and the determined community information. The device identification information and the determined community information may be used to update the device graph, and the visitor profile service 209 may be configured to determine the visitor profile based on the updated device graph. The device identification information (e.g., identifier(s) 217) and the determined community information (e.g., communities for the nodes) may be used to generate (by the visitor profile service 209) a visitor profile that associates the identification information (e.g., a device fingerprint) with an identified community for the visitor device(s). As part of operation 611, the visitor profile service 209 may be configured to convert the updated device graph into a LUT that associates the device identification information with the community information.

At operation 613, a visitor device having again accessed a website may be determined based on the visitor profile. The information obtained by associated identification information (e.g., a device fingerprint) and communities for the visitor device(s) may be leveraged to identify visitor devices returning to the website. As part of operation 613, the VIP 205 may identify the visitor device(s) by associating at least one device fingerprint with the determined community information for the at least one device. For example, the visitor profile service 209 may be configured to generate the visitor profile based on the associated identification information (e.g., fingerprint) and the community information. The visitor profile may then be used by the VIP 205 to determine the visitor device.

At operation 615, the process 600 ends and may be repeated to identify a next visitor device accessing the website.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) Python, Perl, or any other suitable scripting language. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various aspects. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. Any sequence of computer-implementable instructions described in this disclosure may be considered to be an "algorithm" as those instructions are intended to solve one or more classes of problems or to perform one or more computations. While various directional arrows are shown in the figures of this disclosure, the directional arrows are not intended to be limiting to the extent that bi-directional communications are excluded. Rather, the directional arrows are to show a general flow of steps and not the unidirectional movement of information. In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software. In addition, terms such as " . . . unit," " . . . module" described in the specification mean a unit for performing at least one function or operation, which may be implemented as hardware or software, or as a combination of hardware and software. Throughout the specification, expression "at least one of a, b, and c" may include 'a only,' 'b only,' 'c only,' 'a and b,' 'a and c,' 'b and c,' and/or 'all of a, b, and c.'

It is noted that various connections between elements are discussed in the following description. It is noted that these connections are general and, unless specified otherwise, may be direct or indirect, and that the specification is not intended to be limiting in this respect. As described herein, thresholds are referred to as being "satisfied" to generally encompass situations involving thresholds above increasing values as well as encompass situations involving thresholds below decreasing values. The term "satisfied" is used with thresholds to address when values have passed a threshold and then approaching the threshold from an opposite side as using terms such as "greater than," "greater than or equal to," "less than," and "less than or equal to" can add ambiguity where a value repeated crosses a threshold.

What is claimed is:

1. A computer-implemented method comprising:
   capturing, by an identity detector and based on access, by a plurality of devices, to one or more websites, device identification information comprising Internet Protocol (IP) addresses of the plurality of devices;
   generating, by a graph generator of the identity detector, and based on the device identification information, a device graph including a plurality of nodes by:
      associating the plurality of devices with plurality of nodes,
      connecting the plurality of nodes to form the device graph, and
      determining, for a period of time and based on the device identification information, a history indicating, for each of the IP addresses, one or more times when a corresponding IP address was used by at least one of the plurality of nodes;
   determining, based on the history indicating the one or more times, a weight for each pair of connected nodes of the plurality of nodes, wherein each weight for each pair of connected nodes is calculated based on determining, using the history indicating the one or more times, a frequency of instances in which a respective pair of connected nodes share a same IP address;
   determining, by a community detector of the identity detector, and using a community detection algorithm, a community index representing a modularity of the device graph;
   determining, by the identity detector and based on the community index, community information for the plurality of nodes representing respective communities of the plurality of nodes; and
   identifying, by a visitor identity platform, a visitor device having accessed a website based on the device identification information and the determined community information.

2. The computer-implemented method of claim 1, wherein generating the device graph further comprises adjusting the determined-weight for one or more pairs of connected nodes of the plurality of nodes, based on a weighting factor associated with previous authenticated sessions of the devices represented by the one or more pairs of connected nodes, to determine a respective adjusted weight for the one or more pairs of connected nodes, wherein the device graph is generated based on the adjusted weight for the one or more pairs of connected nodes.

3. The computer-implemented method of claim 2, wherein the device identification information comprises a cookie associated with the previous authenticated sessions of the devices represented by the one or more pairs of connected nodes, the weighting factor being based on the cookie.

4. The computer-implemented method of claim 1, wherein generating the device graph further comprises:
selecting, by the graph generator, a first device from the plurality of devices based on corresponding website access times of the plurality of devices; and
associating, by the graph generator, the plurality of nodes with the first device, the device graph being limited to nodes of the plurality of nodes associated with the first device.

5. The computer-implemented method of claim 1, wherein the device identification information comprises at least one device fingerprint of at least one device of the plurality of devices, the identifying the visitor device including associating the at least one device fingerprint with the determined community information for the at least one device.

6. The computer-implemented method of claim 1, wherein the device identification information further comprises:
website access times of the plurality of devices;
one or more domain user identifications; and
one or more device fingerprints.

7. The computer-implemented method of claim 6, wherein the device identification information further comprises one or more cookies associated with one or more previous authenticated sessions of one or more of the plurality of devices.

8. The computer-implemented method of claim 1, wherein the device identification information further comprises one or more cookies associated with one or more previous authenticated sessions of one or more of the plurality of devices.

9. The computer-implemented method of claim 1, wherein identifying the visitor device comprises converting, by the visitor identity platform, the device graph into to a look-up table (LUT) that associates the device identification information with the community information.

10. The computer-implemented method of claim 1, wherein the community detection algorithm is a Louvain algorithm.

11. The computer-implemented method of claim 1, wherein the community detection algorithm is a Leiden algorithm.

12. The computer-implemented method of claim 1, wherein the weight for each pair of connected nodes is based on a multiplicative inverse of a number of the plurality of devices sharing the same IP address at a particular time of the period of time as the devices associated with the respective pair of connected nodes.

13. The computer-implemented method of claim 1, wherein the weight for each pair of connected nodes is further based on a multiplicative inverse of a number of the plurality of devices sharing a same cookie at a particular time of the period of time as the devices associated with the respective pair of connected nodes.

14. A computing device comprising:
one or more processors; and
memory storing instructions that, when executed by the one or more processors, configure the computing device to:
receive respective device identifiers for a plurality of devices, the device identifiers including Internet Protocol (IP) addresses of the plurality of devices and being captured based on access to one or more websites by the plurality of devices;
determining, for a period of time and based on the device identifiers, a history indicating, for each of the IP addresses, one or more times when a corresponding IP address was used by at least one of the plurality of devices;
construct, based on the device identifiers, a device graph by:
connecting nodes corresponding to the plurality of devices; and
determining, based on the history indicating the one or more times, weights for corresponding pairs of connected nodes to determine a weighted device graph, wherein the each weights for the corresponding pairs of connected nodes are calculated based on determining, using the history indicating the one or more times, a frequency of instances in which a respective pair of connected nodes shared a same IP address;
determine, using a community detection algorithm, a modularity score representing a modularity of the weighted device graph;
determine, based on the modularity score, community information for the nodes representing the plurality of devices; and
generate, based on the device identifiers and the community information, visitor profiles for the plurality of devices.

15. The computing device of claim 14, wherein at least one of the weights is further determined based on a cookie associated with a previous authenticated session of at least one device represented by the connected pair of nodes.

16. The computing device of claim 14, wherein each of the device identifiers comprise a device fingerprint of a corresponding device, each of the visitor profiles associating the device fingerprint with respective community information for the corresponding device.

17. One or more non-transitory media storing instructions that, when executed, cause a computing device to:
determine, for a period of time and based on device identifiers of a plurality of devices, a history indicating, for each of a plurality of Internet Protocol (IP) addresses of the plurality of devices, one or more times when a corresponding IP address was used by at least one of the plurality of devices, wherein the IP addresses were captured based on access to one or more websites by the plurality of devices;
generate, by an identity detector of the computing device, and based on device identifiers of a plurality of devices, a device graph including a plurality of nodes respectively corresponding to the plurality of devices, wherein at least two of the plurality of nodes are connected based on the device identifiers;
determine a weight for each pair of connected nodes of the plurality of nodes to generate a weighted device graph, wherein each weight for each pair of connected nodes is calculated based on determining, using the history indicating the one or more times, a frequency of instances in which the pair of connected nodes share;
determine, by the identity detector, and using a community detection algorithm, communities for the plurality of devices represented in the weighted device graph; and
determine, by a visitor identity platform of the computing device, a visitor profile for one or more of the plurality of devices based on respective device identifiers and the determined communities.

18. The one or more non-transitory media of claim 17, wherein the weight is determined further based on: a previous authenticated session of the devices corresponding to the respective pair of connected nodes, and network location addressing information of the devices corresponding to the respective pair of connected nodes.

19. The one or more non-transitory media of claim 17, wherein the instructions, when executed, cause the computing device to identify, based on the visitor profile, a visitor device having accessed a website.

\* \* \* \* \*